United States Patent [19]

Parker

[11] Patent Number: 4,950,722

[45] Date of Patent: Aug. 21, 1990

[54] UNSATURATED EPOXY MOIETY, UNSATURATED MONOMER AND LIQUID EPOXY COMPOUND SOLUTION

[75] Inventor: Theodore L. Parker, Lafayette, Calif.

[73] Assignee: The Dow Chemical Company, Midland, Mich.

[21] Appl. No.: 294,927

[22] Filed: Jan. 5, 1989

Related U.S. Application Data

[62] Division of Ser. No. 725,851, Apr. 22, 1985, abandoned.

[51] Int. Cl.$^5$ .................. C08G 8/30; C08G 59/14; C08L 63/10
[52] U.S. Cl. ................................. 525/502; 525/526; 528/119; 528/369
[58] Field of Search ................ 525/111, 502, 526; 528/119, 369

[56] References Cited

U.S. PATENT DOCUMENTS

| | | | |
|---|---|---|---|
| 3,984,376 | 10/1976 | Yokono et al. | |
| 4,264,748 | 4/1981 | Oriel et al. | 523/109 |
| 4,397,993 | 8/1983 | Tefertiller et al. | 525/328.2 |
| 4,401,499 | 8/1983 | Kaneko et al. | 156/307.3 |

OTHER PUBLICATIONS

*The Condensed Chemical Dictionary*, Eighth Edition, Van Nostrand Reinhold Co., New York, N.Y., 1971, p. 590.

*Primary Examiner*—John C. Bleutge
*Assistant Examiner*—Robert E. Lee Sellers, II

[57] ABSTRACT

The invention relates to an unsaturated-epoxy moiety R—NHCO$_2$—E wherein R is unsaturated and free of isocyanate functionality and E has an oxirane ring. The moiety may be dissolved in a liquid epoxy compound. The invention also relates to a mixture obtained by vinyl polymerization of the moiety and an added unsaturated compound in the liquid epoxy compound solution. Epoxy cross-linking then leads to a polymeric reaction product. Vinyl polymerization and epoxy curing can also be simultaneous. A polymeric material is formed by reacting an isocyanate compound having the formula R—NCO with an epoxy compound having the formula E—OH, where R and E are as defined above, to form the moiety R—NHCO$_2$—E and polymerizing this moiety, along with an additional unsaturated compound under vinyl polymerization conditions and in the presence of a liquid epoxy compound, to form a copolymer of R—NHCO$_2$—E with the additional unsaturated compound. Cured epoxy systems are provided of improved toughness and reduced brittleness. The viscosity of a liquid epoxy compound can be controlled to be as low as is necessary for filament winding and other operations through adding an additional unsaturated compound such as styrene while the cross-linking of the liquid epoxy compounds leads to the formation of a single phase polymer.

5 Claims, No Drawings

UNSATURATED EPOXY MOIETY, UNSATURATED MONOMER AND LIQUID EPOXY COMPOUND SOLUTION

This is a division of application Ser. No. 725,851 filed Apr. 22, 1985, now abandoned.

TECHNICAL FIELD

The invention relates to a monomer having both epoxy and vinyl functionality, to synthesizing polymeric materials utilizing such a composition and to polymerized products made from such a monomer.

BACKGROUND ART

Epoxy resin systems are generally relatively brittle and do not exhibit as much toughness as would be desired. This restricts their usefulness to instances when such brittleness and lack of toughness can be tolerated. Improved toughness would be advantageous, for example, in epoxy adhesives and coatings and in composites of glass and/or graphite fibers embedded in cured epoxy resins such as are used for aircraft bodies and parts.

For some requirements, such as for filament winding, a liquid epoxy compound is coated on filaments as they are being wound and is cured in place. Another use for epoxy resin systems is wherein a liquid epoxy compound is flowed around a pack or bundle of interwoven or parallel glass or graphite fibers and cured. In such situations the viscosity of the liquid epoxy compound must not be too high. Unfortunately, the viscosity of the liquid epoxy compound will generally be rather high for such uses. Also, because the liquid epoxy compound is polymerizing as it is being coated on the filament or flowed about the fibers it is very difficult to control the viscosity to be as low as is necessary throughout the entire operation. The prior art has added such compounds as styrene to the liquid epoxy compound in order to lower its viscosity. This, however, creates another problem in that a two phase system normally results with polystyrene, which results from simultaneous heat catalyzed vinyl polymerization of the styrene, dispersed in the resulting cured epoxy resin.

A practical consideration with the utilization of epoxy resin systems is that the epoxy compounds from which they are formed are generally quite expensive. Accordingly, it would be desirable to provide inexpensive compositions which could be incorporated in epoxy resin systems and serve as diluents without adversely effecting the properties of such systems.

The present invention is directed to solving one or more of the problems as set forth above.

DISCLOSURE OF INVENTION

In accordance with one embodiment of the present invention an unsaturated-epoxy moiety is set forth having the formula: R—NHCO$_2$—E wherein R is unsaturated and free of isocyanate functionality and E has an oxirane ring.

In accordance with another embodiment of the present invention the aforementioned unsaturated-epoxy moiety is present in solution in a liquid epoxy compound.

In accordance with yet another embodiment, the present invention comprises a mixture obtained by polymerization under vinyl polymerization conditions of the solution resulting from incorporation of an added unsaturated compound with the unsaturated-epoxy moiety in the liquid epoxy compound.

Still another embodiment of the present invention comprises a polymeric reaction product obtained by cross-linking under epoxy curing conditions the mixture obtained by vinyl polymerization as set forth above.

Yet another embodiment of the present invention comprises a cured polymeric composition obtained by simultaneously vinyl polymerization and epoxy curing of the unsaturated-epoxy moiety plus an additional unsaturated compound in the liquid epoxy compound.

Another embodiment yet of the present invention comprises a method of producing a polymeric material by reacting an isocyanate compound having the formula: R—NCO, wherein R is unsaturated and free of isocyanate functionality, with an epoxy compound having the formula: E—OH, wherein E has an oxirane ring, to form an unsaturated-epoxy moiety having the formula: R—NHCO$_2$—E and polymerizing the unsaturated-epoxy moiety along with an additional unsaturated compound under vinyl polymerization conditions and in the presence of a liquid epoxy compound to form a copolymer of the unsaturated-epoxy moiety with the additional unsaturated compound.

BEST MODE FOR CARRYING OUT THE INVENTION

The present invention provides an unsaturated-epoxy moiety having the formula: R—NHCO$_2$—E, wherein R is unsaturated and free of isocyanate functionality and E has an oxirane ring. R may be substantially any unsaturated group, for example, R may be any of the following groups:

$CH_2$=$C(CH_3)$—COO—$CH_2CH_2$—

$CH_2$=$C(H)$—COO—$CH_2CH_2$ $CH_2$=$C(H)$—$C_6H_4$—

$CH_2$=$C(CH_3)$—$C_6H_4$—

$CH_2$=$C(H)$—CO—

$CH_2$=$C(CH_3)$—CO—

$CH_2$=CH—$CH_2$—

Preferably, R will be of the formula: $CR^1{}_2$=$CR^2CO_2R^3$—. More preferably, each of the $R^1$ groups will be hydrogen, the $R^2$ group will be methyl, or hydrogen and the $R^3$ group will be alkylene, =/$(CH_2)_n$=/, preferably where n=2. More generally, each of the various $R^1$ and $R^2$ groups may be hydrogen alkyl groups or aryl groups.

The group E has an oxirane ring. It can be represented by the general formula:

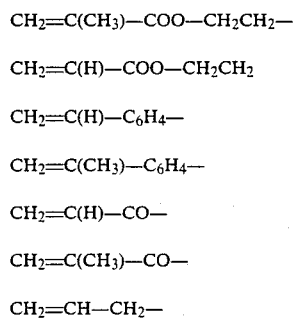

where Q is aliphatic or aromatic or both and may contain either ether (—O—), thio-ether (—S—), or ester

functionality, and may include from 1 to 36 carbons and from 0 to about 12 heteroatoms in the backbone, and up to 6 hydroxyl substituents.

Specific examples of such compounds include:

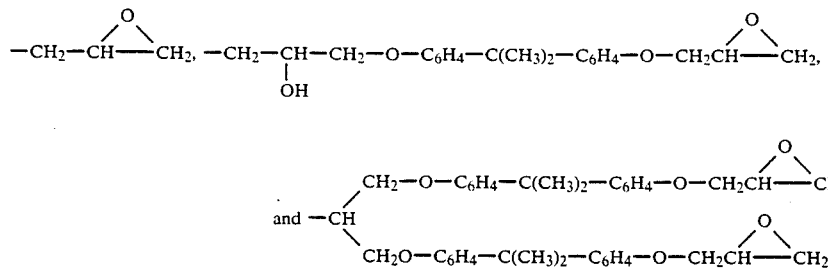

with the former two groups being preferred.

The unsaturated-epoxy moiety as set forth above can be produced by reacting an isocyanato compound having the formula: RNCO with a compound having the formula: EOH. In such an instance, the isocyanate (NCO) functionality reacts with the hydroxyl functionality to produce a urethane linkage of great stability. The reactants can be heated to a desired temperature for the reaction and an appropriate catalyst such as stannous octoate, tributyl tin acetate, dibutyl tin diacetate, N-methyl morpholine, triethylamine, triethylenediamine, or the like, may be added so as to facilitate the reaction.

A number of monoisocyanate compounds which have unsaturation may be utilized as the compound RNCO. Particularly useful are the various isocyanatoalkyl acrylate esters. One useful compound which is illustrative of this group is isocyanatoethyl methacrylate. The methyl group of the methyacrylate may be replaced with hydrogen, various lower alkyl groups such as ethyl, propyl or butyl, or the like.

The isocyanatoethyl group may be replaced with isocyanatopropyl group, or the like. Also, the hydrogens on the methacrylate methylene group may be replaced with alkyl, or aryl groups. The following list of compounds are believed to be particularly useful as the isocyanato compounds in forming the unsaturated-epoxy moiety in accordance with the present invention:

CH$_2$=C(CH$_3$)—COO—CH$_2$CH$_2$—NCO and

CH$_2$=CH—CH$_2$—NCO

The compound E—OH may be any of a wide range of oxirane ring containing compounds. However, it is preferred that the compound E—OH be a partially hydrolyzed liquid epoxy resin having a hydroxyl equivalent weight of from about 1000 to about 2500. Suitable liquid epoxy resins include: Dow* resin DER-331*, a partially hydrolyzed, partially advanced diglycidyl ether of bisphenol A; and Dow* resin DER-438*, an epoxidized phenolformaldehyde novolak resin (*=Trademarks of The Dow Chemical Company).

A particularly useful composition comprises the unsaturated-epoxy moiety as set forth above dissolved in an excess of a liquid epoxy compound, generally the same liquid epoxy compound from which the unsaturated-epoxy moiety has been formed. Indeed, it is advantageous to react a minor amount of the isocyanato compound RNCO with a major amount of a liquid epoxy resin having a small amount of hydroxyl functionality to thereby form the unsaturated-epoxy moiety in situ in the liquid epoxy compound.

In the situation where the unsaturated-epoxy moiety is dissolved in a liquid epoxy compound it is sometimes advantageous to copolymerize the unsaturated groups along with an added unsaturated compound by subjecting a liquid epoxy compound solution containing an unsaturated monomer in addition to the unsaturated-epoxy moiety to vinyl polymerization conditions while not yet subjecting the solution to epoxy curing conditions. Such can be the case when the desired final product is being modified to increase its toughness and resiliency as by incorporating a monomer such as an alkyl, aryl, alkenyl or alkynyl acrylate, e.g., n-butylacrylate or the like, which polymerizes to form an elastomeric polymer. Conventional vinyl polymerization conditions can be utilized, including the use of heat and/or free radical catalysts such as benzoyl peroxide. The result of such a vinyl copolymerization is the production of a plurality of small elastomeric particles which have been vinyl copolymerized with the unsaturated-epoxy moiety, the particles being dispersed in the liquid epoxy compound.

Once the aforementioned mixture has been obtained it may be subjected to epoxy curing conditions. The resulting polymer is in the nature of a cross-linked epoxy resin having a plurality of generally uniformly dispersed small regions which are essentially a vinyl elastomer and which can be rubberlike. Furthermore, since the vinyl polymer particles have pendant epoxy functionality they can be cross-linked to the liquid epoxy compound as that compound is cured and becomes solid rather than liquid. Thus, while there are vinyl polymerized particles in a matrix of an epoxy polymer, these particles are chemically united with the epoxy polymer whereby improved resiliency and toughness result for the cured epoxy resin.

Alternatively, the vinyl copolymerization and the epoxy curing can be simultaneous.

The solution of the unsaturated-epoxy moiety in the liquid epoxy compound finds other uses as well. The viscosity of a liquid epoxy compound can be controlled by mixing a viscosity modifier which has an unsaturated functionality with the solution of the unsaturated-epoxy moiety in the liquid epoxy compound. The viscosity modifier might comprise, for example, styrene, α-methyl styrene, t-butyl styrene, divinyl benzene, methyl acrylate or methyl methacrylate or the like. A liquid epoxy compound having about 5 mole percent of unsaturated-epoxy moiety will allow up to about 20 weight percent styrene to be used as a viscosity modifier without phase separation occurring on simultaneous vinyl polymerization and epoxy curing. Preferably, no more than about 10 weight percent of the viscosity modifier is used. Vinyl polymerization conditions may be established as by adding a free radical initiator, heating or the like. The resulting composition is in the nature of polystyrene cross-linked with the unsaturated portion of the vinyl-epoxy moiety. The epoxy functionality can be cured to form a solid single phase resin which incorporates the copolymerized styrene. The vinyl polymerization and the epoxy curing can take place either sequentially or simultaneously with the latter being favored and with the rates of the reactions being balanced to provide a one phase matrix. The styrene serves to adjust the viscosity of the liquid epoxy compound solution prior to curing of the epoxy whereby it is useful for filament winding purposes, being flowed about packs or bundles of interwoven or parallel glass or graphite fibers, for reducing the cost of the resulting resin, and the like. The unsaturated-epoxy moiety, in essence, varies the solvent properties of the epoxy compound sufficiently so that the styrene can be incorporated into a single phase cured system rather than separating into a distinct phase.

The concept of the invention will be more apparent from the following illustrative examples.

EXAMPLE 1

Preparation of Dual Functional Unsaturated-Epoxy Moiety In Liquid Epoxy Compound The liquid epoxy resin, DER-331 (a Trademark of The Dow Chemical Company), a partially hydrolyzed mixture of epoxy species which is conveniently represented by the formula:

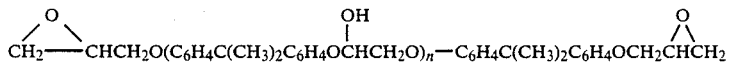

wherein n=0.15 and with a hydroxyl equivalent weight of about 1700 was placed in a two liter flask equipped with a mechanical stirrer and addition funnel. 500 mg of stannous octoate was also placed in the flask which was heated to 80° C. Isocyanatoethyl methacrylate, 9.3 gram, 0.2 equivalent, based on a hydroxyl equivalent weight of 1700 for the liquid epoxy compound, was added drop-wise to the stirred solution from the addition funnel over a 10 minute period and the reaction mixture was held at 80° C. for an additional 15 minutes following addition of the isocyanotoethyl methacrylate. A viscous solution comprising the unsaturated-epoxy moiety dissolved in excess liquid epoxy compound resulted from this reaction.

EXAMPLE II

The reaction mixture obtained from Example I was vinyl polymerized by adding benzoyl peroxide and heating. The result was an increase in viscosity without phase separation.

EXAMPLE III

Production of Unsaturated-Epoxy Moiety and Incorporation of n-butyl Acrylate Monomer A series of reactions were carried out utilizing a liquid epoxy compound having an unsaturated-epoxy moiety therein and produced in accordance with Example I. The series of reactions utilized from 0.05 to 1.0 equivalent of the isocyanatoethyl methacrylate per equivalent of hydroxyl based on a hydroxyl equivalent weight of 1700 for the liquid epoxy compound (DER-331). A constant amount of n-butyl acrylate (10 weight percent) was added to aliquots of the products of each of the reactions and the resulting solutions were subjected to vinyl polymerization conditions followed by epoxy curing conditions. Different particle sizes were observed for elastomeric particles formed during the vinyl polymerization as were different degrees of toughness for the eventual cured epoxy products. The use of about 0.4 equivalent of the isocyanato methacrylate provided the best toughening.

EXAMPLE IV

Preparation of Glycidyl N-methacryloylethyl Urethane

Glycidyl N-methacryloylethyl urethane (I) was prepared by addition of glycidol to isocyanatoethyl methacrylate. The glycidal N-methacryloylethyl urethane (4 weight percent) was dissolved in DER-331

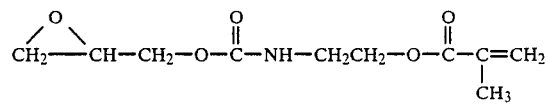

as was 10 weight percent styrene. Vinyl polymerization and epoxy curing were carried out simultaneously to form a one-phase cured epoxy resin.

INDUSTRIAL APPLICABILITY

The present invention provides epoxy resins of improved toughness and flexibility as well as providing styrene modified epoxy filament winding epoxy resins which are of acceptably low viscosity and which are uniform and do not separate on being subjected to epoxy curing conditions.

What is claimed is:

1. A solution comprising an unsaturated-epoxy moiety having the formula R—NHCO$_2$—E wherein R is an unsaturated group free of isocyanate functionality and E is a group having an oxirane ring and an unsaturated monomer other than said moiety dissolved in a liquid epoxy compound.

2. A mixture obtained by the vinyl copolymerization of the solution of claim 1.

3. A polymeric reaction product obtained by simultaneously subjecting a solution as set forth in claim 1 to vinyl polymerization conditions and epoxy curing conditions.

4. A polymeric reaction product obtained by cross-linking the mixture of claim 2 under epoxy curing conditions.

5. A polymeric reaction product as set forth in claim 4, further characterized in that said unsaturated monomer is styrene, α-methyl styrene, t-butyl styrene, divinyl benzene, or an alkyl or aryl acrylate.

* * * * *